May 26, 1931. C. PACE 1,806,704
ICE CREAM CUTTER
Filed Aug. 5, 1930
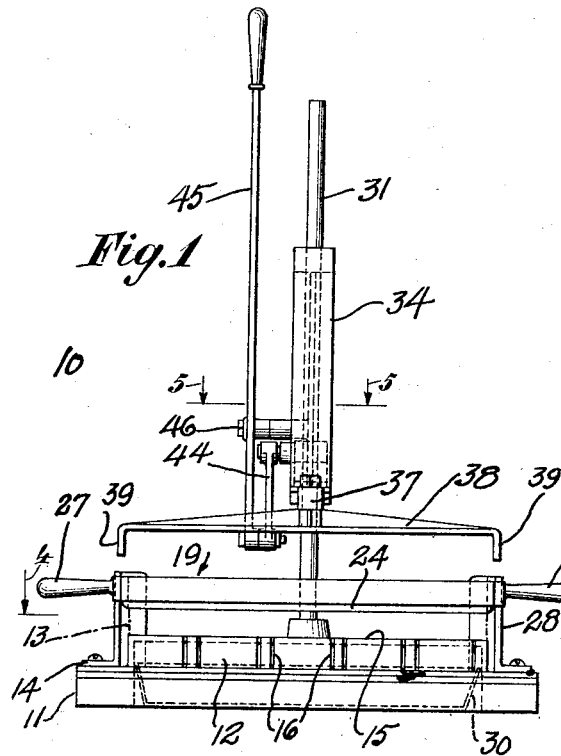
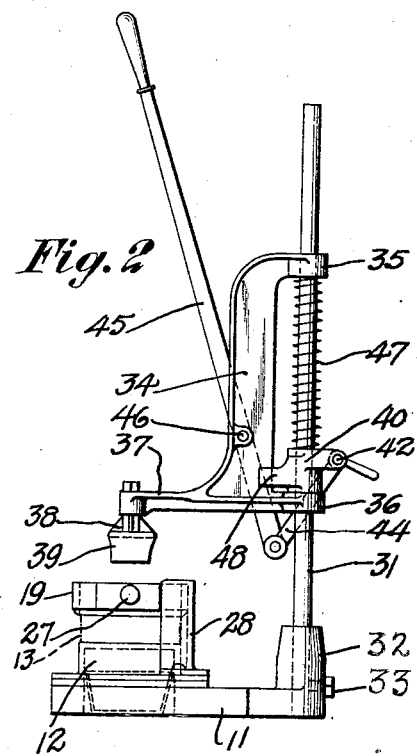
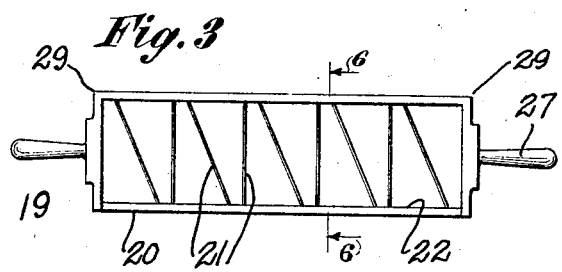
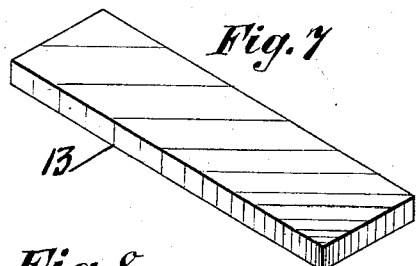
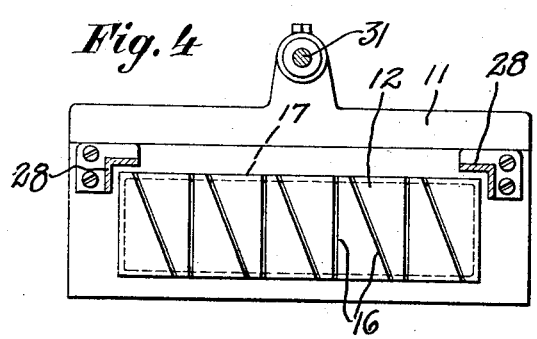
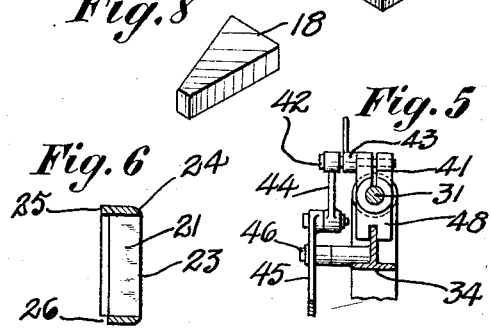
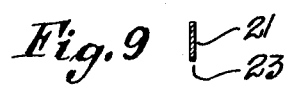
INVENTOR
Canio Pace
BY
Luis Schumacher
ATTORNEY Patented May 26, 1931

1,806,704

UNITED STATES PATENT OFFICE

CANIO PACE, OF CONEY ISLAND, NEW YORK

ICE CREAM CUTTER

Application filed August 5, 1930. Serial No. 473,170.

This invention relates to cutting devices and has particular reference to cutters for ice cream.

One object of the invention is to provide a device of the character described having improved means for severing a block of ice cream into cakes of predetermined size and shape.

Other objects are to provide an improved cutter per se; an improved die co-operating with the same; improved guide means for the cutter; and improved means for actuating the cutter.

A further object of the invention is the provision of an improved cutting device to neatly, quickly and conveniently sever a block of ice cream into cakes, said device having few and relatively simple parts, being inexpensive to manufacture and assemble, rugged and reliable in operation, and efficient in use to a high degree.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view in front elevation of a device embodying the invention.

Fig. 2 is a view in side elevation thereof.

Fig. 3 is a top plan view of the cutter per se.

Fig. 4 is a horizontal sectional view taken on line 4—4 of Fig. 1.

Fig. 5 is a horizontal sectional view taken on line 5—5 of Fig. 1.

Fig. 6 is a sectional view taken on line 6—6 of Fig. 3.

Figs. 7 and 8 are isometric views of a block, and cake of ice cream severed therefrom, respectively.

Fig. 9 is a cross sectional view of one of the blades of the cutter.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a device embodying the invention. The same may include a base 11 carrying a support or die 12 which is mounted thereon in any suitable relation, preferably stationary. This die is of any required size and shape, preferably in conformity with a block of ice cream 13 to be placed thereon, with the edges of the ice cream block in coincidence with those of the die. The latter may be hollow, and can be formed as a stamping or casting, and it may include flanges 14 whereby the die is secured to the base. Extending downward from the plane, horizontal top face 15 of the die are openings or kerfs 16 which may be formed by a saw, or the like. These kerfs extend along vertical planes not only through the top wall of the die but also through the side walls 17 thereof to the base of the die. The kerfs are spaced from and arranged with respect to each other in any suitable relationship, or as shown in the drawing to cause the block of ice cream 13 to be severed into cakes 18.

Co-operating with the die 12 is a separate cutter 19 which may include a frame 20 of any suitable but preferably box like form, and having blades 21 extending thereacross in fixed relation. The frame is so constructed as to be adapted to receive the die 12 in the rectangular opening 22 formed by the frame, while the blades are received in the openings 16 of the die.

After a block of ice cream 13 is placed on the die 12, the cutter 19 is placed upon the block. Since the lower or cutting edges 23 of the blades 21 lie in one plane, these serve to evenly support the cutter on the ice cream block preliminary to the severing action. Preferably, the said lower edges 23 may be flat or dull to afford sufficient support to permit the cutter to be adjusted, if necessary, on the ice cream block, without prematurely cutting thereinto. Nevertheless said blades 21 are relatively thin to permit the ice cream to be readily severed, and the kerfs 16 are relatively wider than said blades for sufficient clearance and to prevent the ice cream from obstructing the passage of the blades. In fact, the hollow structure of the die 12 is also an aid in preventing accumulation of ice cream on the kerfs.

To obviate obstruction of the frame 20 of the cutter with respect to the ice cream block, the lower edges of the frame are beveled off on the outside as at 24 to form cutting edges to shave off any irregularity or other projection in the ice cream block. It will thus be seen that the cakes finally produced are wholly uniform.

It will be noted that the side wall structure of the cutter 19 has a greater depth than the blades, so that the top edges 25 of the former may project above the top surface 15 of the die and form a low rim or flange around the latter to retain the cakes 18 against accidental displacement. But the blades 21 enter the die below the surface 15 thereof so as not to impede the removal of the cakes, and the front wall of the cutter frame may be similarly arranged as at 26 to facilitate the removal of the cakes by sliding the same off the die.

The cutter may be manipulated in any suitable manner, for example, mechanically, or by means of handles 27 centrally secured at the opposite ends of the frame 20.

Guiding the cutter 19 are a plurality of angular upright elements 28, or the equivalent, which are secured to the base 11 and are positioned at the rear corners of the die but in spaced relation thereto. The corners 29 of the frame have removable guiding coaction with the elements 28.

If desired, the base 11 of the device may also be hollow, whereby a removable container 30 may be disposed therein to collect any cream that may be forced by the blades downward through the kerfs.

The hardness of ice cream will vary with the degree of freezing to which it may have been subjected, and also the amount and size of the particles of ice therein. Where the hardness is considerable, it may be advisable to provide power means to actuate the cutter, especially where a plurality of cakes 18 are to be simultaneously cut.

One form of power means may include a vertical bar 31 fixed in a hub 32 of the base by a set screw 33. Mounted on this bar for reciprocatory movement therealong is a bracket 34. The latter may have a plurality of spaced hubs 35, 36 slidable along the bar and a front- ward extending arm 37 fixedly carrying an actuator 38. To bear uniformly on the cutter, the said actuator is elongated in the direction of the length of the cutter, and may be provided with downward extending projections 39 to bear on the end portions of the cutter frame.

To reciprocate the means 34 along the bar 31, a collar 40 may be mounted on the bar 31 in fixed or adjustable relation. This collar may be split at 41, and may be drawn tight around the bar by a bolt 42 operated by a handle 43. The latter may also constitute a connection for a link 44, to which is engaged a lever 45 pivotally mounted at 46 on the means 34. Taking around the bar 31 is a coil spring 47 bearing at one end on hub 35 and at its other on collar 40, thus tending to raise the actuating means until stopped by the collar as shown in Fig. 2. To prevent the actuating means from rotating around the bar 31, the collar may have a grooved portion 48 for guiding coaction with the actuating means.

The operation of the device will now be apparent. An ice cream block 13 is placed on the die, and the cutter 19 is then placed on the ice cream. Then the lever 45 is depressed causing the block to be severed into cakes 18. Upon release of the lever 45, the actuating means is automatically raised by spring 47. Now the ice cream cakes may be removed from the die, after which the cutter is removed, and the operation may be repeated.

It will be clear that materials other than ice cream may also be cut on the machine, and that the blades 21 may be of various sizes, shapes, and arrangements to produce different types of cakes.

It will be appreciated that various changes and modifications may be made in the device as shown in the drawings, and that the same is submitted in an illustrative and not in a limiting sense, the scope of the invention being defined in the following claims.

I claim:

1. An ice cream cutter including a stationary die for receiving a block of ice cream thereon, a removable cutter including a closed frame and blades extending across said frame, a handle whereby the cutter may be placed on the ice cream block, a plurality of stationary guide elements adjacent to the die but spaced therefrom to coact with the frame for guiding the cutter with respect to the die, said die having openings for wholly receiving the blades when the cutter is moved with the blades severing the said block into cakes, said frame being constructed to relatively closely receive the ice cream block when the blades are in said openings, said frame having an opening portion for lateral sliding and removal of the ice cream cakes from the die.

2. An ice cream cutter including a base, a die thereon, a cutter coacting with the die to sever into cakes a block of ice cream placed on the die, a bar extending upward from the base, an adjustable collar on the bar movable therealong, means movable along the bar to actuate the cutter, said collar constituting a stop for said means in its movement away from the cutter, a spring acting between the collar and the said means, said spring tending to move the latter away from the cutter, and means acting between the collar and the first mentioned means to move the same toward the cutter against the force of said spring, said adjustable collar being split and having a bolt to tighten the same around the bar, said last mentioned means including a link connected at one end to said bolt, and a lever connected to the other end of said bolt and pivoted on the means for actuating the cutter.

3. An ice cream cutter including a base, a die thereon, a cutter coacting with the die to sever into cakes a block of ice cream placed on the die, a bar extending upward from the base, a collar on the bar movable therealong, means movable along the bar to actuate the cutter, said collar constituting a stop for said means in its movement away from the cutter, a spring acting between the collar and the said means, said spring tending to move the latter away from the cutter, and means acting between the collar and the first mentioned means to move the same toward the cutter against the force of said spring, said collar having guiding coaction with the first mentioned means to prevent rotation thereof around the bar.

4. An ice cream cutting device including a die having a top face to receive a block of ice cream thereon, said die having openings therein extending downward from said top face, an ice cream cutter to sever the block into cakes, including a continuous closed frame and blades extending across the frame, said blades being disposed to register with said die openings to be received therein and with the frame receiving the die, said blades and die openings being so constructed that the blades when fully received in said openings are below the top face of the die, a portion of said frame being disposed to extend above the top face of the die to retain the ice cream cakes thereon, and another portion of said frame being disposed below the said top face of the die to facilitate the sliding removal of the cakes therefrom.

In testimony whereof I affix my signature.

CANIO PACE.